Figure 1:
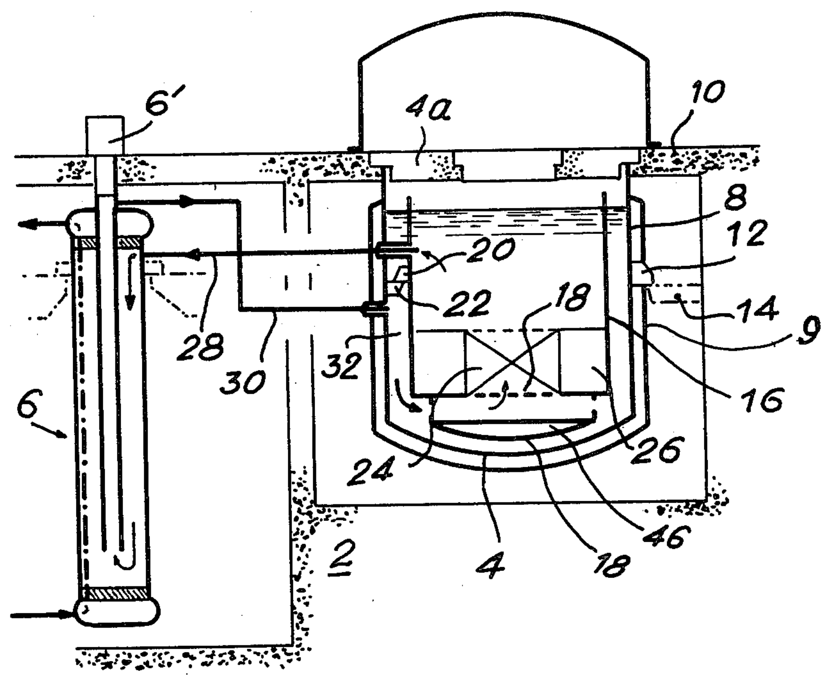

United States Patent [19]

Robin

[11] 4,295,934

[45] Oct. 20, 1981

[54] LIQUID-METAL-COOLED NUCLEAR REACTOR

[76] Inventor: Marcel Robin, 25, Avenue de l'Europe, 92310 Sevres, France

[21] Appl. No.: 51,517

[22] Filed: Jun. 22, 1979

[30] Foreign Application Priority Data

Jun. 23, 1978 [FR] France ............................... 78 18823

[51] Int. Cl.[3] ....................... G21C 15/00; G21C 11/08

[52] U.S. Cl. .................................... 376/203; 376/285; 376/395; 376/403

[58] Field of Search ....................... 176/40, 38, 65, 87, 176/DIG. 2, 62, 63, 64

[56] References Cited

U.S. PATENT DOCUMENTS

| | | | |
|---|---|---|---|
| T911,015 | 6/1973 | Garkisch et al. | 176/87 |
| 3,182,002 | 5/1965 | Laithwaite et al. | 176/40 |
| 3,486,973 | 12/1969 | Georges et al. | 176/64 |
| 3,818,935 | 6/1974 | Karker et al. | 176/87 |
| 4,022,656 | 5/1977 | Durston et al. | 176/87 |
| 4,080,255 | 3/1978 | Rylatt | 176/40 |
| 4,081,322 | 3/1978 | Aubert et al. | 176/65 |
| 4,087,325 | 5/1978 | Chevallier et al. | 176/65 |
| 4,113,562 | 9/1978 | Jones | 176/60 |
| 4,154,651 | 5/1979 | Kenworthy et al. | 176/87 |
| 4,174,123 | 11/1979 | Schluderberg | 176/87 |

FOREIGN PATENT DOCUMENTS

| | | | |
|---|---|---|---|
| 1564054 | 11/1969 | Fed. Rep. of Germany . | |
| 2804560 | 8/1978 | Fed. Rep. of Germany | 176/38 |
| 2133348 | 11/1972 | France | 176/87 |
| 2379881 | 1/1978 | France . | |
| 2429478 | 1/1980 | France . | |
| 1041042 | 9/1966 | United Kingdom | 176/87 |
| 1130911 | 10/1968 | United Kingdom | 176/87 |

*Primary Examiner*—Harvey E. Behrend

[57] ABSTRACT

A liquid metal cooled nuclear reactor comprising a core, a main vessel comprising a first supporting means, a primary vessel mounted inside said main vessel and coaxial therewith, at least one exchanger outside said vessels. Said primary vessel comprises a core-diagrid and a second supporting means integral with the main vessel lateral wall and with the primary vessel lateral wall. These lateral walls define an annular space in which is formed a horizontal partition.

6 Claims, 6 Drawing Figures

6' 4a 10 8 12 20 22 18 14 9 28 30 32 16 6 26 24 46 2 4 18

N''
16d
N'
N
16
16a
16b
8
32a
28

56
54
20
24
60
22
40
52
30
16c
32
50
40a
18a
32b
18C
42a
42
18d
46
18b
48
18
40b

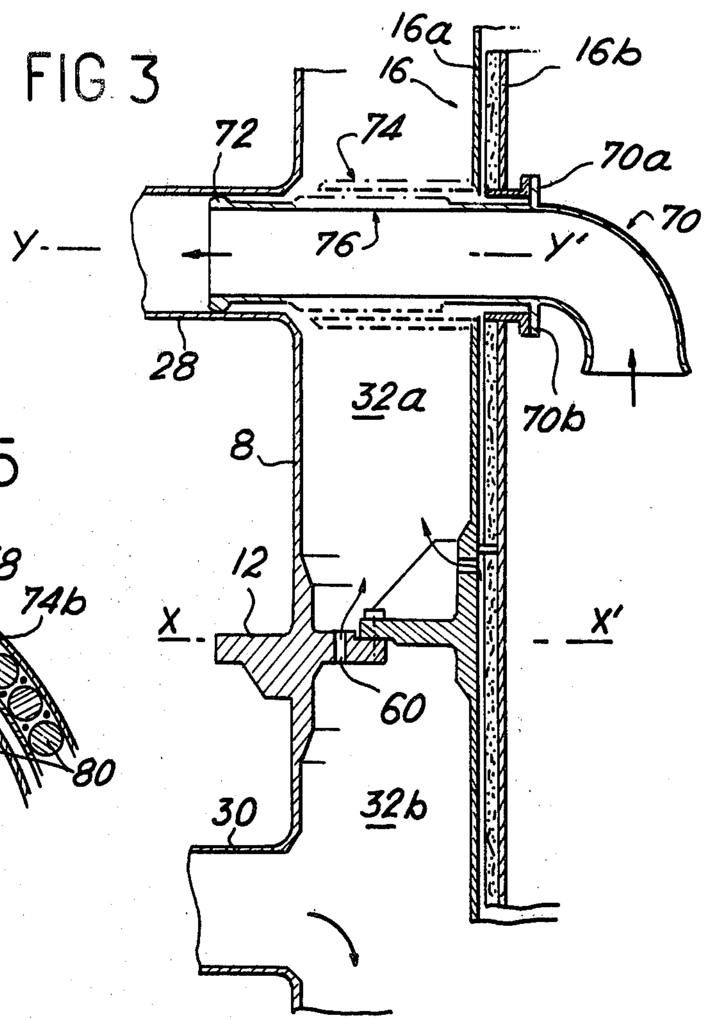
FIG 3
16a
16b
16
72
74
70a
70
Y
76
Y'
28
32a
70b
8
12
X
X'
60
30
32b
FIG. 5
74a
78
74b
76b
80
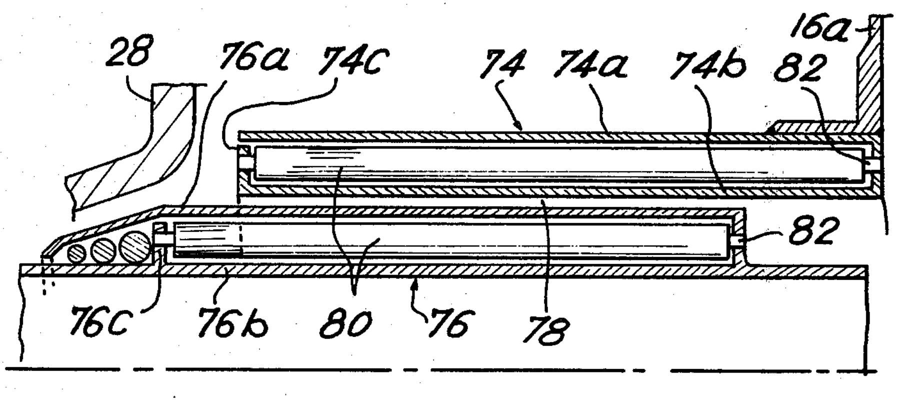
FIG. 4
16a
28
76a
74c
74
74a
74b
82
82
76c
76b
80
76
78

LIQUID-METAL-COOLED NUCLEAR REACTOR

The present invention relates to a liquid-metal-cooled nuclear reactor and, more specifically, to such a reactor of the semi-integrated type, as described, e.g., in French patent application Ser. No. 78/18822 filed on June 23, 1978, by the applicant. The present invention, however, could also be applied with advantage to a liquid-metal-cooled nuclear reactor with cooling loops, in such instances where said reactor comprises a primary vessel within a main vessel. An example of a reactor of the latter type is described in German patent No. 1,564,054, filed on Dec. 15, 1966. It is to be noted, however, than in reactors of the latter type, the vessels are suspended, the sodium inlet and outlet ducts are coaxial and tightness between the internal vessel and the hot-sodium duct is provided by bellows extending along the whole periphery of said vessel, which of course results in intricate problems as regards manufacture and maintenance. Moreover, the main vessel top portion is separated from the hot sodium merely by "stagnant" sodium, the temperature of which, in operation, rises to about that of the hot sodium.

It is known that, in the field of fast-neutron nuclear reactors, there exist two main categories that differ from each other by the structure of the coolant circuit in which flows the primary liquid metal, usually liquid sodium, said two categories comprising reactors with cooling loops, on the one hand, and integrated reactors, on the other hand. In the first category, the reactor vessel merely contains the core with its testing and handling devices, together with the liquid metal flowing through said core, whereas the core neutronic protection devices, the primary heat-exchangers and the pumps for driving the primary liquid metal adapted to cool said core are all arranged outside the reactor vessel. Usually a liquid metal secondary circuit is provided, said circuit being adapted to exchange heat with the radioactive primary liquid metal (primary exchanger), on the one hand, and with a water-steam circuit (secondary exchanger) adapted to feed turbines generating electric power, on the other hand. Fast nuclear reactors of the integrated type are provided with a main vessel wherein is to be found a primary vessel containing the core, the core neutronic protection devices and the core testing and handling devices. Said main vessel also contains the primary heat exchangers and the primary pump. In other words, the liquid metal primary circuit is included in its entirety within said main vessel. Said primary vessel, on the other hand, has mainly the function of separating the hot liquid metal issuing from the core and directed towards the primary exchangers, from the cold liquid metal issuing from the primary pump and recycled at the core lower end.

The present invention relates to a liquid-metal-cooled fast reactor either of the type comprising loops and a primary vessel, or of the semi-integrated type.

In reactors of such types, the heat exchangers and the pump are outside the vessel. However, the vessel also comprises an internal vessel or primary vessel for separating the hot liquid metal from the cold liquid metal and, in the case of semi-integrated reactors, the primary vessel contains not only the core but the core neutronic protection devices too. In the latter instance, with a view to rendering the reactor more compact and, accordingly, substantially decreasing its manufacturing cost, the liquid sodium or metal secondary circuit have been eliminated, so that the exchanger-pump assemblies fed by the liquid metal flowing through the core have to exchange the heat contained therein directly with a water-steam circuit that feeds the electric-power generating turbines. A pump-heat exchanger assembly thus permitting to eliminate the secondary circuit is known and disclosed in French application Ser. No. 77. 03192, filed on Feb. 4, 1977, for a "Bloc échangeur-pompe" (Pump-heat exchanger assembly), in the name of the applicant.

More specifically, the present invention, in that type of nuclear reactors, relates to the cooling of the main vessel upper portion and to the passage through the vessels of the outlet duct for the hot liquid metal having circulated through the core.

It will be easily understood, indeed, that, since a primary vessel and a main vessel are provided and the hot liquid metal outlet duct opens into said primary vessel, said duct has necessarily to pass through the annular space defined by said primary and main vessels. In addition, as already specified, the object of the primary vessel is to separate a zone containing a rather cold liquid metal from a rather hot liquid metal. It will be easily understood that this will raise problems of differential thermal expansion (in particular between the various vessels), such a thermal expansion having to be taken into account as regards the structure and connection of the hot liquid metal outlet duct, or ducts, since said duct, or ducts, have to be connected to a device for exchanging heat between the liquid metal and the water-steam circuit.

For solving the above problems, the present invention relates to a liquid metal cooled nuclear reactor, characterized in that it countains:

a core comprising a plurality of fuel assemblies provided with a tubular bottom fitting and the neutronic protection devices for said core, a main vessel comprising a bottom portion, a lateral wall and first supporting means arranged at a determined level, said means being integral with the outer surface of said lateral wall, a primary vessel, mounted inside said main vessel and coaxial therewith, said primary vessel comprising a diagrid adapted to support and feed the reactor core, a lateral wall and second supporting means integral with the lateral wall of said main vessel and with the lateral wall of said primary vessel, respectively, said means being at said determined level, the lateral walls of said vessels defining an annular space there between;

means forming a horizontal partition within said annular passage, said means being substantially at said determined level;

at least one exchanger outside said vessels for exchanging heat between said liquid metal and water, or steam;

a first connecting-duct between the inlets of said exchanger, or exchangers, and the inside of the primary vessel, said first duct opening into said primary vessel above said core and passing through said annular space above said horizontal partition with the help of means for passing through said space;

a second connecting-duct between the outlets of said exchanger, or exchangers, and said annular space, said second duct opening into said annular space at a lower level than said horizontal partition so as to cause said cold liquid metal to flow in said diagrid, then through the core starting from the fuel-assemblies bottom fittings, and, means for collecting a portion of said cold liquid metal, and feeding same into said annular space, above said partition.

By "core" is meant the core proper and its lateral and axial neutronic protection devices, its testing devices and the means for handling the fuel assemblies.

Preferably, said primary vessel is constituted by an inner sleeve extending over at least a portion of the height of the lateral wall of said primary vessel, and an outer sleeve, said two sleeves being in parallel relationship and defining an interstice, or space, containing a thermal insulation, said interstice being connected, at the lower portion thereof, to the manifold mounted under the diagrid and adapted to collect the leaks from the fuel-assembly bottom fittings, said outer sleeve being provided with a plurality of evenly distributed orifices, or ports, opening into said annular space above said horizontal partition.

Conveniently, said first duct is constituted by a piping connected to the inlet of the/one heat-exchanger, on the one hand, and to an orifice, or port, provided in the main vessel, on the other hand, and by a short sleeve, one extremity of which is tightly attached to said primary vessel, while the other extremity thereof, which is free, penetrates into said piping and is surrounded by a semi-tight joint adapted to cooperate with the inner surface of said piping.

Figure 2:
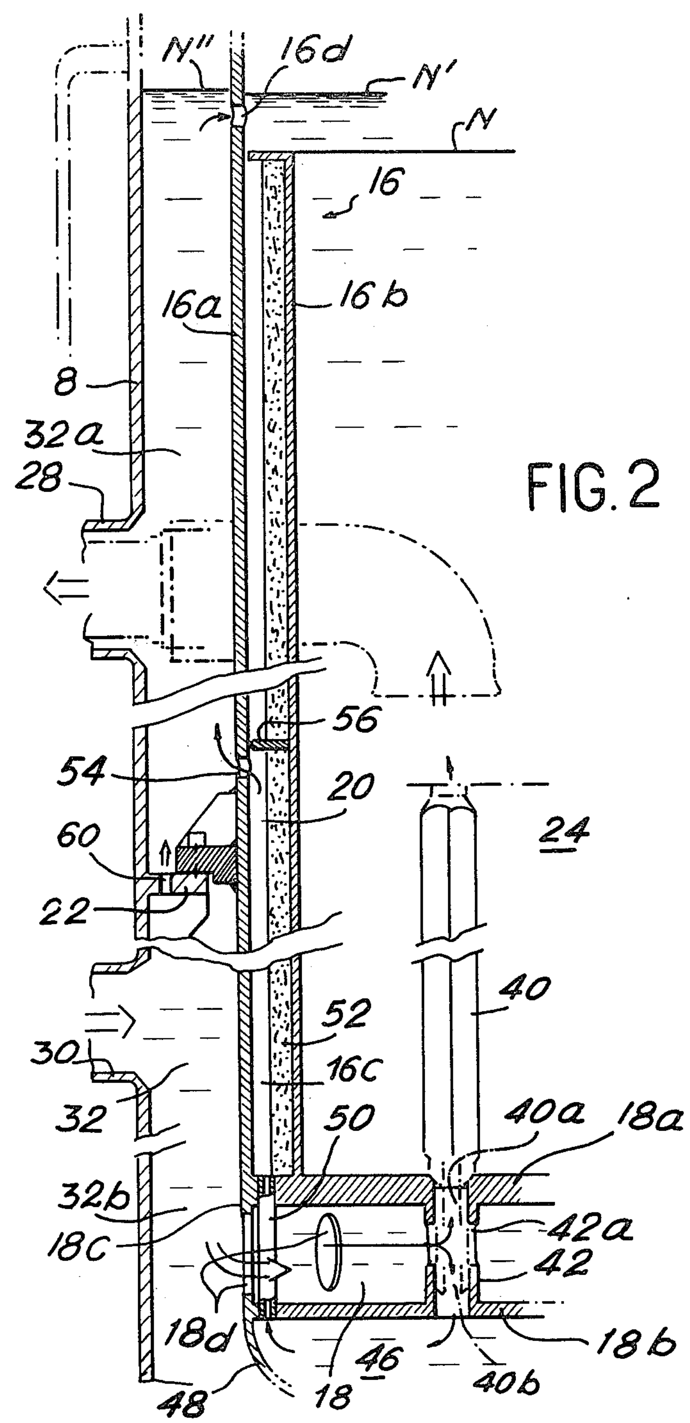
Figure 3A:
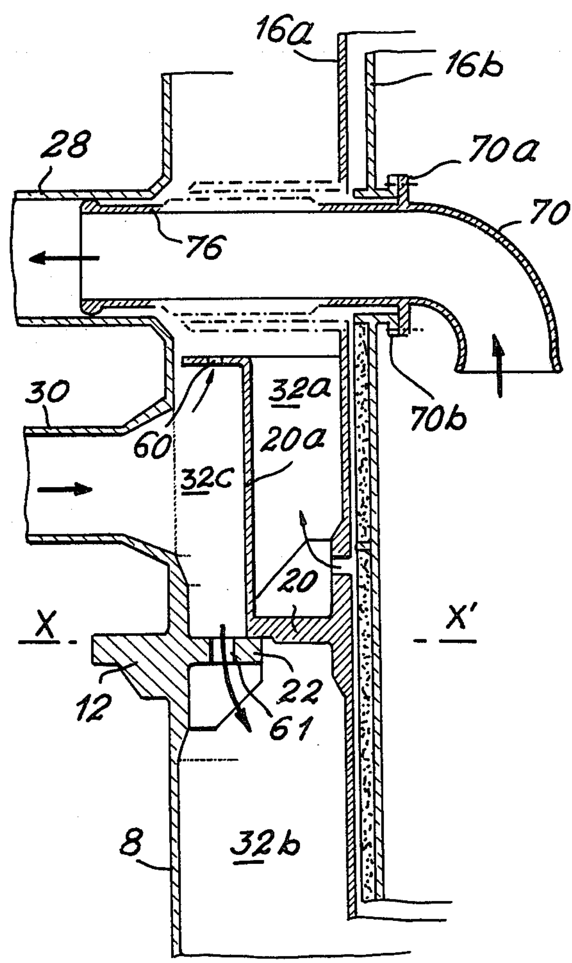

Other features of the present invention will appear from the following description of several embodiement given merely by way of examples, with respect to the accompaning drawing, wherein FIG. 1 is a diagrammatic view of a nuclear plant, showing the vessel of the semi-integrated reactor together with a heat-exchanger;

FIG. 2 is a general view disclosing how the primary vessel thermal insulation and the cooling of the main vessel upper portion are obtained;

FIG. 3, a detailed view of a portion of FIG. 2, disclosing how the passage of the hot liquid metal outlet duct through the two vessels is achieved;

FIG. 3*a*, is a detailed view of a portion of FIG. 2, showing a variant of FIG. 3, and, FIGS. 4 and 5 are a longitudinal section and a cross-section, respectively, of the duct of FIG. 3, showing the means for the thermal insulation of said duct in the space defined by the primary vessel and the main vessel.

The main components of the nuclear reactor are diagrammatically represented in FIG. 1. Within a concrete enclosure 2 are to be found the main vessel/4 of said nuclear reactor and a heat-exchanger 6. It is to be noted that the nuclear reactor might be provided with a plurality of cooling loops comprising, each, a heat-exchanger 6 associated to vessel 4. In the specific example described, exchanger 6 is adapted to provide the exchange of heat directly between the liquid metal issuing from the reactor vessel 4 and the steam/water. Quite obviously, it would not be going beyond the scope of the present invention to resort to an exchanger 6 adapted to exchange heat between the sodium fed into said vessel (viz. the "primary" sodium, in the present case) and secondary sodium, as is usual in reactors with loops. In particular, the present invention can be applied to a reactor of the latter type, the main vessel of which contains a primary vessel for separating the hot liquid metal from the liquid metal that has been cooled in the intermediate heat-exchangers. Pump 6' for driving the liquid metal is integrated in the exchanger with a view to rendering the whole installation less cumbersome by removing the duct connecting said devices.

In the particular instance of a semi-integrated reactor, vessel 4 comprises, first, an upper portion 8 supported through supporting peripheral flanges such as 12 resting on supporting members 14 connected to concrete structure 2. The vessel is closed by a roof slab 4*a* resting on the upper peripheral flange of main vessel 8. Within main vessel 8 is contained a primary vessel 16 coaxial with said main vessel and provided with a bottom 18. Said primary vessel 16 is provided, along the periphery thereof, with supporting members 20 cooperating with supporting members 22 integral with the main vessel inner surface for forming a semi-tight partition. It is to be noted that the members supporting the main vessel and those supporting the primary vessel are situated substantially in the same horizontal plane. Primary vessel 16 contains core 24 resting on bottom 18 together with lateral neutronic protecting members 26. In addition, the main vessel can, optionally, be surrounded by a safety vessel 9 acting as a lining and adapted to collect sodium should said main vessel be leaking.

The flow of liquid metal between vessel 4 and exchanger 6 is obtained through an outlet duct 28 connecting the inside of primary vessel 16 with the inlet of exchanger 6, and through a duct 30 for admitting cooled liquid metal, the latter duct connecting the oulet of the exchanger-pump assembly with the annular space 32 between the main vessel and the primary vessel. It can readily be seen that duct 28 along which flows a hot liquid metal that has passed through the core, passes through annular space 32 containing a less hot liquid metal.

Referring now to FIG. 2, it can be seen that, according to the present embodiment, the lateral wall of primary vessel 16 is, in fact, constituted by an outer sleeve 16*a* and an inner sleeve 16*b* defines an interstice, or space, 16*c*. In addition lower perforated plate 18, that usually goes by the name of "core diagrid" is in fact constituted by an upper plate 18*a*, and a lower plate 18*b* connected by a perforated lateral plate 18*c*, thus forming a space 18 in communication with annular space 32. Into the sleeves connecting plates 18*a* and 18*b* are inserted bottom fittings 40*a* of fuel assemblies 40 that form the nuclear reactor core 24. Lateral wall 18*c* is provided with orifices, or ports, such as 18*d*, and sleeves 42 are provided with orifices 42*a* for feeding corresponding orifices in bottom fittings 40*a*. It is to be noted that the fuel-assembly bottom fittings have, each, a lower orifice 40*b* opening into a space 46 limited by sheet 48 integral with lower plate 18*b*, said space forming the leak manifold.

The liquid metal main path is the following: cold liquid metal is driven along duct 30 by the forcing pressure of the pump (viz from 5 to 10 bars) and is fed into annular space 32. The liquid metal main flow penetrates into corediagrid 18 via orifices, or ports, 18*d*, then rises into fuel-assemblies 40 where is it heated. Then, the thus-heated liquid metal is evacuated towards the heat-exchanger, or exchangers, via conduit, or conduits, 28.

As mentioned previously, one of the main features of the present invention lies in that the upper portion 8 of main vessel 4 is caused to cool. To that end, the annular space 32 between the main vessel and the primary vessel is divided into an upper zone 32*d* and a lower zone 32*b*, by means of a horizontal partition, the latter being constituted preferably, by the combination of supporting members 20 and 22, of the primary vessel and of the main vessel, respectively. These members therefore form a continuous horizontal ring separating space 32a from space 32b and provided, as will be specified later on, with calibrated orifices. The cold liquid metal fed through inlet duct 30 fills all the lower portion 32b of the annular space. The primary vessel upper portion is cooled by cold metal liquid introduced into upper portion 32a of annular space 32. To that end, it is first resorted to that portion of the fuel-assembly feed liquid leaking through the bottom fittings 40b and collected by leak-manifold 46.

To that end, tubes 50 arranged along the periphery of diagrid 18 pass through the whole thickness of the latter. Moreover, the lower ends of sleeves 16a and 16b are welded to the core-diagrid upper sheet 18a, whereas tubes 50 open into interstice, or space 16c. In the latter interstice, there is a thermal-insulation layer 52, constituted by a plain sheet or by sticks of highly heat-conductive steel, fixed to inner sleeve 16b. Outer sleeve 16a is provided with calibrated orifices 54 opening into the upper portion 32a of annular space 32, viz. above the horizontal partition constituted by supporting members 20 and 22.

In addition, a ring-shaped horizontal partition 56 mounted between sleeves 16a and 16b above orifices 54 forms a barrier adapted to restrain the liquid metal from refluxing into the space between 16a and 16b, above ring 56. Outer sleeve 16a is provided, at the upper extremity thereof, with a plurality of orifices, or ports, 16d adapted to cause annular space 32a to communicate with the inside of the primary vessel, at a slightly higher level than the liquid metal normal level in said primary vessel.

This coolant circuit of the upper portion 8 of the main vessel operates as follows: the cold liquid metal at average pressure contained in lead-manifold 46 is taken up by tubes 50 and is thus fed into annular interstice 16c from which it is sent into upper zone 32a of annular space 32 via calibrated orifices 54. The liquid metal therefore fills up zone 32a from which it is evacuated through orifices 16d. The main vessel upper portion is thus cooled down to a temperature that is lower than the limit creep temperature of the steel used, viz. about 425° C. On the other hand, the pouring operation at the top of the vessel permits to form a further layer N′ of liquid metal over surface N of the hot liquid metal, said layer N′ being "colder" than layer N and, therefore, having a lower vapour-pressure, which is of advantage since surface layer N′ thus isolates the hot liquid metal from inert gas cover 16d (e.g. argon), thus restricting the metal vapour concentration in said inert gas and restraining top slab 4a from being overheated by the radiations of the liquid metal.

It is to be noted that outer sleeve 16a alone provides the mechanical support of core-diagrid 18 and that sleeve 16b is used only for delimiting the hot sodium, settling thermal insulation layer 52 an channeling the leaks towards space 32a. The function of the insulation layer, however, is merely to separate the primary vessel hot liquid metal from "cold" liquid metal contained in space 32. Now, in the primary vessel, hot liquid metal is actually to be found above core 24 only, i.e. at the upper onlets of fuel-assemblies 40. That is why, according to a variant (not shown), sleeve 16b can be interrupted slightly under the core upper surface and interstice 16c is closed, at the lower portion thereof, by a ring-shaped partition similar to partition 56. In such a case, tubes 50 should be extended by means of ducts connecting said tubes with annular interstice 16c or directly with orifices 54.

It is, however, to be feared that the leak-flow rate of the fuel-assembly bottom fittings which is under average pressure (e.g; 20 meter head of sodium) would not be sufficient for ensuring the cooling down of upper portion 8 of main vessel 4. This is the reason why, as is more clearly visible in FIG. 3, orifices 60 have been provided in the horizontal partition formed by supporting members 20 and 22, said orifices 60 being calibrated or, if required, adjustable by means of a device (not shown) of the needle valve type. An extra amount of cold liquid metal is thus obtained, since in zone 32b the liquid metal is substantially at the forcing pressure of the pumps. In addition, orifices 60 act as gas-vents when the main vessel is being filled with sodium.

With reference to FIGS. 3 to 5, an embodiment of how hot liquid metal outlet duct 28 passes through the main vessel and the primary vessel will now be given. It can be easily understood that, at that level, two types of problems are raised, viz, first, the problem of the differential thermal expansion of both vessels and, secondly, the problem of how to isolate duct 28 carrying hot liquid metal from the cold liquid metal contained in space 32a, at least as regards that portion of said duct in annular space 32a.

As far as the thermal expansion of the vessels is concerned, it is of prime importance to specify that this problem has already been almost fully solved, since, according to the invention, the supporting members 20 and 22 of the primary vessel and of the main vessel are at the same level, and, in addition, the spacing between supporting plate XX′ and the duct YY′-axis is as small as possible. Therefore, the "expansion length" of both vessels between plate XX′ and axis YY′ is very small. However, the vessel temperature differential may be not negligible, since the hot liquid metal is at a temperature in the vicinity of 530° C. (primary vessel), whereas the cold liquid metal is at a temperature of about 350° C. (main vessel).

As can be seen in FIG. 3, outlet piping 28 is actually welded to upper portion 8 of main vessel 4 and communication between said piping and the inside of primary vessel 16 is ensured by a small sleeve 70 passing through annular space 32. Said small sleeve 70 is attached to sleeve 16b by means of flanges 70a and 70b integral with sleeves 70 and 16b respectively. At the free end thereof, small sleeve 70 is provided with a semi-tight gasket 72 cooperating with the inner surface of tube 28. In addition, said gasket has a curved outer profile so as to form a "ball joint" in a way. Said gasket 72 is preferably constituted by a ring mounted, with some clearance, in a groove provided in the outer surface of the free end of small sleeve 70.

It will be thus clearly understood that the effects resulting from radial and axial expansion of both vessels can be absorbed without generating stresses while, at the same time, minimizing the liquid metal leaks.

As regards the thermal insulation of small sleeve 70, it is provided by two relatively movable annular insulating members, viz. An outer sheath 74 attached to outer sleeve 16a, on the one hand, and a cylindrical bushing 76 fixed to the outer surface of the small sleeve, on the other hand. The space 78 between these two insulating members contains stagnant liquid metal. Thus, these insulating members are not submitted to any mechanical stress resulting from the expansion of the vessels.

Preferably, each of said insulating means 74 and 76 comprises two cylindrical sheets (74*a*, 74*b* and 76*a*, 76*b*, respectively) between which are mounted steel sticks 80. Annular sheets 74*c*, 76*c*, respectively, permit to immobilize said sticks. They are provided with orifices 82 adapted to prevent any pressure effect in the inner spaces defined by said sheets. Exhaust holes (not shown) are also provided in the lower portion of sheets 74*a*, 76*a*.

It will thus be easily understood that a very good thermal insulation is obtained between the cold liquid metal in zone 32*a* and the hot liquid metal in tubing 28 and small sleeve 70, without submitting these insulating means to any thermal stress whatever, while allowing both vessels to expand freely.

The combination of the above-described devices, in the present example adapted to provide the cooling of the main vessel, on the one hand, and the exhaust of hot sodium from the primary vessel, on the other hand, can be directly applied to a reactor with loops comprising a primary vessel for separating hot sodium from cold sodium.

In FIGS. 1 to 3, cold liquid metal duct 30 is shown as welded to an orifice, or port, of main vessel 16 opening into annular space 32 under the semi-tight partition. A variant of interest (shown in FIG. 3*a*) consists in connecting duct 30 with main vessel 16 in the vicinity of the liquid metal free level in annular space 32*a*, and in extending same, in said annular space, by a small sleeve passing through the semi-tight partition that separates space 32*a* from space 32*b*, or else in providing flange 20 with a ring 20*a* adapted to define with vessel 8 an annular space 32*c* in communication (by means of large orifices 61 in flange 22) with annular space 32*b* and with annular space 32*a* by the clearance between collar 20*a* and vessel 8 (and, if required, by means of orifices 60 in either collar 20 or flange 22). That variant permits to have the orifices in ducts 28 and 30, situated above rest flange 12 of main vessel 8, which may facilitate the building of vessel 8 that can thus be stopped at a level lower than flange 12 so that ducts 28 and 30 no longer pass through said vessels.

The main advantage of that variant is to prevent the suction of the liquid metal around the primary vessel, should a big leak occur in duct 30 between the main vessel and the heat-exchanger; in fact, it can be observed that such a risk is very limited, in view of the fact that said duct is provided with a protective sheath, e.g. of the type of that of the primary sodium ducts in French experimental reactor RAPSODIE.

I claim:

1. A liquid metal cooled nuclear reactor comprising:

a core constituted by a plurality of fuel-assemblies provided with a tubular bottom fitting and by its neutronic protection means;

a main vessel comprising a bottom portion, a lateral wall and first supporting means arranged at a determined level, said first means being integral with the outer surface of said lateral wall;

a primary vessel, mounted inside said main vessel and coaxial therewith, said primary vessel comprising a corediagrid for supporting and feeding the reactor core, a lateral wall and second supporting-means integral with the primary vessel lateral wall and with the main vessel lateral wall, respectively, the two laterial walls of said two vessels defining an annular space;

a semi-tight horizontal partition in said annular passage;

at least one heat-exchanger outside said vessels for ensuring a heat-exchange between said hot liquid metal and cold water;

a first connection duct for the hot metal between the inlet of said exchanger and the inside of the primary vessel above said core, said first duct opening into said primary vessel above said core and passing through said annular space above said horizontal partition by means for passing through said space;

a second connection duct for said cold metal, between the outlet of the said exchanger and said annular space, said second duct opening into said annular space, so as to cause said cold liquid metal to flow in said core diagrid, then through said core, via the bottom-fittings of the fuel-assemblies, wherein:

said first supporting means and said second supporting means are substantially at the same horizontal level, said level being, in addition, in the vicinity of the level of said first and said second connecting ducts;

said primary vessel is constituted by an inner sleeve extending over at least a portion of the height of the lateral wall of the primary vessel, and an outer sleeve, parallel with said inner sleeve, said sleeves defining an interstice, containing thermally insulating means, said interstice being connected, in the lower portion thereof, to a manifold mounted under said core diagrid, for collecting the leaks of the liquid metal at the core bottom and the outer sleeve comprises a plurality of orifices opening into said annular space above said semi-tight horizontal partition;

the portion of said first duct passing through said annular space is surrounded by thermally insulating means adapted to withstand the differential expansion between said two vessels;

said semi-tight horizontal partition is constituted by said second supporting means, the latter being provided with calibrated orifices.

2. The nuclear reactor according to claim 1, wherein said first duct is constituted by a piping connected to the inlet of the heat-exchanger, on the one hand, and to an orifice provided in said main vessel, on the other hand, and by a small sleeve, one extremity of which is tightly connected to said primary vessel, whereas its other extremity, that is free, penetrating into said piping is surrounded by a semi-tight gasket adapted to co-operate with the inner surface of said tubing.

3. The nuclear reactor according to claim 2, wherein said small sleeve is surrounded by a thermally insulating sleeve fixed thereto, and wherein said insulating sleeve is surrounded by a thermally insulating sheath, one extremity of which is integral with said primary vessel.

4. The nuclear reactor according to claim 2, wherein said semi-tight gasket is constituted by a ring mounted with some clearance in a circular groove provided in the outer surface of said small sleeve in the vicinity of the free extremity of the latter, that surface of said ring cooperating with said tubing being of rounded shape so as to form a ball-joint.

5. The nuclear reactor according to claim 1, wherein the second duct for feeding back the cooled liquid metal penetrates into said main vessel at a lower level than the horizontal partition that divides the annular space between said primary vessel and said main vessel.

6. A nuclear reactor according to claim 1, wherein said second duct for the cooled liquid metal penetrates into said main vessel at a lower level than said horizontal partition situated in the vicinity of the supporting plane of the two vessels, and opens into an annular space between said main vessel and the primary vessel supporting means, said annular space being in communication, via said horizontal partition, with the space defined by the lower portions of said primary and main vessels.

* * * * *